United States Patent [19]

Barnes et al.

[11] Patent Number: 4,876,941

[45] Date of Patent: Oct. 31, 1989

[54] COMPOSITE FOR PROTECTION AGAINST ARMOR-PIERCING PROJECTILES

[75] Inventors: Albert L. Barnes, Wickliffe; Thomas M. Clere, Hudson, both of Ohio; Gholamreza J. Abbaschian, Gainesville, Fla.; Douglas J. Wheeler, Tolland, Conn.

[73] Assignee: Eltech Systems Corporation, Boca Raton, Fla.

[21] Appl. No.: 140,077

[22] Filed: Dec. 31, 1987

[51] Int. Cl.$^4$ .............................................. F41H 5/00
[52] U.S. Cl. ...................................... 89/36.02; 109/82; 428/527; 428/689; 428/697; 428/698; 428/704; 428/911; 501/89; 501/92; 501/96
[58] Field of Search ................. 89/36.02; 109/82; 428/911, 527, 689, 697, 698, 704; 501/89, 92, 96

[56] References Cited

U.S. PATENT DOCUMENTS

| | | | |
|---|---|---|---|
| 3,251,700 | 5/1966 | Mandorf, Jr. ........................... | 106/65 |
| 3,328,280 | 6/1967 | Richards et al. ...................... | 204/243 |
| 3,895,150 | 7/1975 | King et al. ........................... | 89/36.02 |
| 4,030,427 | 6/1977 | Goldstein ............................. | 89/36.02 |
| 4,093,524 | 6/1978 | Payne .................................... | 204/61 |
| 4,514,268 | 4/1985 | DeAngelis ............................. | 204/67 |
| 4,605,633 | 8/1986 | DeAngelis ............................. | 501/87 |

FOREIGN PATENT DOCUMENTS 0033630 7/1984 European Pat. Off. .
0164830 12/1986 European Pat. Off. .

OTHER PUBLICATIONS

The Journal of the American Ceramics Society, vol. 60, No. 12, pp. 674–679.

*Primary Examiner*—Stephen J. Lechert, Jr.
*Attorney, Agent, or Firm*—John J. Freer

[57] ABSTRACT

A composite for protection against armor-piercing projectiles is disclosed. The composite can be a ceramic composite which may be utilized alone or with other materials, e.g., a metallic or plastic base or substrate layer. Composites of AlN with $TiB_2$, SiC, $B_4C$ or their mixtures are utilized. These ceramic composites can be prepared by hot pressing, reaction hot pressing, hot isostatic pressing or pressureless sintering. The composite may have well dispersed grains for at least one component, which grains can be interconnected with grains of the second component, and the grains may be of a size less than about five microns. The composite in layer form can have a metallic cover layer.

32 Claims, No Drawings

COMPOSITE FOR PROTECTION AGAINST ARMOR-PIERCING PROJECTILES

CROSS-REFERENCE TO RELATED APPLICATIONS

This application is a continuation-in-part of U.S. patent application Ser. No. 945,116, filed Jan. 6, 1987, which in turn is a continuation-in-part of U.S. patent application Ser. No. 825,402 filed Feb. 3, 1986 and now abandoned.

BACKGROUND ART

U.S. Pat. Nos. 3,251,700 and 3,328,280 disclose hot pressed or sintered particulate mixtures including $TiB_2$ and AlN. Such products were typically found to be useful in accordance with their electroconductivity characteristic, e.g., utilized in electrolytic cells for the production of aluminum.

U.S. Pat. No. 4,605,637 discloses a reaction sintered composite ceramic-ceramic material of $TiB_2$ and AlN. The composite has been taught for use in aluminum production cells or the like owing to an electroconductive property and good mechanical properties. However, such utilization need not rely on any property of the composite to be resistant to shock treatment.

SUMMARY OF THE INVENTION

The present invention is directed to providing resistance against ballistic threats, and utilizing the above-mentioned shock-resistant property. The invention also may take advantage of the high hardness and modulus of a ceramic composite. Initially, owing to the presence of the ceramic composite, the invention can be an assembly having desirable impact resistance and fracture toughness. The ceramic composite can be very fine grained. The interconnected grains of the ceramic composite are well dispersed, thereby enhancing composite properties.

In a most important aspect, the present invention is directed to an armor plate layered composite for protection against projectiles and having enhanced resistance to penetration from high kinetic energy projectiles, which armor plate comprises a metal substrate and a surface layer composite ceramic on the substrate, the composite being of very finely-divided and interconnected grains of $TiB_2$ and AlN.

In another aspect, the invention is directed to an armor plate assembly having a ceramic composite that can include AlN in mixture with one or more of $B_4C$, SiC or $TiB_2$. In yet another aspect, the invention relates to preparing an armor plate by applying to a metallic substrate a ceramic composite as above defined. Other aspects include armor plate of the ceramic composite in assembly with other than a metal substrate as well as freestanding ceramic composite armor which further may be used in association with a spall cover.

DESCRIPTION OF THE PREFERRED EMBODIMENTS

The armor plate for the present invention can have a metal substrate or base layer. Such base layer may be elemental metal, an alloy or intermetallic mixture. The metal of the base layer for the armor plate can include, for example, steel including stainless steel, as well as aluminum, or titanium. Advantageously for desirable armor protection coupled with economy and lightweight characteristic, the base layer metal will include aluminum. Furthermore, the armor plate can include a ceramic composite in assembly with a plastic, e.g., the ceramic composite molded together with a thermoplastic resin. Any such plastic as has been found suitable for use with armor is contemplated as serviceable for utilization in the present invention. Moreover, the ceramic composite can be useful, such as in tile form, in combination with fibrous or woven material, e.g., as tiles in pockets of a Kevlar vest. Or, the ceramic composite may be utilized in freestanding form and in such form be encased or the like by a spall cover.

When used with a base, e.g., a substrate metal or plastic, the ceramic composite will usually be in flat lamina form, e.g., as a tile or sets of tiles secured to a metal. In tile form the ceramic can thus form a layer on a base metal or plastic. The ceramic can be a composite, or ceramic-ceramic, of $TiB_2$-AlN, SiC-AlN, $B_4C$-AlN or their mixtures. Preferably for best impact resistance coupled with fracture toughness, the ceramic composite is $TiB_2$-AlN.

It is comtemplated that for the ceramic composites, all such may suitably be prepared by any of reaction hot pressing, more conventional hot pressing, hot isostatic pressing or pressureless sintering operation. In initiating any of these operations, a starting mixture of very finely divided particulates, e.g., powders, is most typically well mixed to provide a uniform intermixture of materials. Any usual method for providing such a mixture may be used including wet milling. The milling may proceed in a suitable solvent, e.g., a halogenated hydrocarbon, and the resulting milled mixture dried. Additionally, the mixture may include a binder and the mixture may be formed and shaped before further processing. The usual techniques employed for such shaping are suitable. These techniques include cold pressing, slip casting, injection molding, or other forming technique used prior to further processing to provide some initial "green strength" for the starting mixture. Also included in the initial processing, there can be used a preheat, or calcining operation. This preheating or calcining will proceed at a moderate temperature, usually under vacuum. Where calcining yields an agglomerated mixture, the mixture can be subsequently de-agglomerated, as by milling. The material thus prepared is then ready for pressureless sintering, or for reaction hot pressing, or for the more conventional hot pressing, it being understood however that hot isostatic pressing may also be useful.

For reaction hot pressing or more conventional hot pressing, any hot pressing equipment that can provide the elevated temperature and pressure is contemplated as useful. Usually the material will be loaded in a mold having an annular die and equipped with an upper or lower plunger, or with both. Graphite molds have been found to be especially serviceable. The loaded mold can be placed in a furnace equipped for vacuum or inert gas feed and capable of providing the required elevated temperatures. The material loaded to the mold may be at room temperature, or the material may be at a more elevated temperature such as from a preheating or calcining.

It is contemplated that the reaction hot pressing or the more conventional hot pressing will always be carried out under elevated pressure. This can be only an elevated die pressure. Thus, it may be advantageous, as for removal of any by-product volatile materials, such as might occur during binder removal, that the zone around the die be at reduced atmospheric pressure. The elevated die pressure, typically on the order to 750 to 7500 psi., can assist in obtaining a final product having enhanced density. It is also believed that elevated pressure will provide for a more desirable product uniformity, as well as provide for temperature uniformity, e.g., during reaction hot pressing. For the atmosphere around the die, a simple subatmospheric pressure will be suitable, with a pressure on the order of 0.001 Torr to 0.00002 Torr typically being employed. A more amplified description of reaction hot pressing has been presented in the U.S. patent application Ser. No. 945,116, which description is incorporated herein by reference.

For pressureless sintering, after formation of a green strength shape, the shape may be initially fired in a furnace at a low temperature, e.g., to remove any binder. Heating can be continued, and typically gradually elevated, the continued heating being utilized to reduce porosity and then for providing a final, dense product. Generally this elevated temperature operation is conducted under vacuum or in an inert atmosphere.

Regardless of the method of preparation, the resulting ceramic composite may be provided in suitable form such as for securing to a plastic or metal substrate, e.g., in tile form, or it may be put into such form. Thus large prepared shapes can be worked, such as by machining, to serviceable layer shapes. Thereafter, for preparing a base metal armor plate, the ceramic composite articles, such as tile form articles, can be secured to a base metal. The ceramic can be secured to the base metal by adhesive bonding, e.g., with epoxy glue. Alternative fastening methods include diffusion bonding, mechanical fastening including bolting, as well as brazing, welding, soldering or combinations thereof. Such fastening methods may also be serviceable for securing the ceramic composite to a base plastic, it being understood that molding of the composite with the plastic can also be utilized.

In layered or lamina form, the armor plate layered composite can have a ratio of metal or plastic thickness to ceramic thickness of from about 1:1 to about 6:1. Generally a thickness ratio of base to ceramic of less than about 1:1 may provide insufficient base support to provide desirable structural rigidity for the armor plate. On the other hand, a ratio of the thickness of base to ceramic of greater than about 6:1 can sacrifice fracture toughness for the armor plate layered composite. It is typical to provide a cover layer for the armor plate layered composite. The cover layer can be metal, e.g., the same or similar metal to the metals of a base metal. Typically this metal cover will be of a thickness that is less than the thickness of the ceramic composite layer, although the same or even a greater thickness for the cover layer is contemplated. When the cover layer is present it can be secured to the underlying ceramic composite by one or more of the same means as discussed hereinbefore for fastening the ceramic composite to a base layer.

In one important aspect, the present invention pertains to the preparation of armor plate where the ceramic composite for the plate is produced by reaction hot pressing. In a more special aspect, such operation is conducted in accordance with reaction schemes preparing the $TiB_2$ and AlN ceramic-ceramic composite. More particularly, these reaction schemes are as follows:

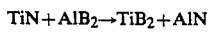

$TiN + AlB_2 \rightarrow TiB_2 + AlN$

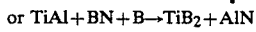

or $TiAl + BN + B \rightarrow TiB_2 + AlN$

In the foregoing, the first reaction is of especial interest. In this reaction, the TiN ceramic reacts with the $AlB_2$ which can be expected to pass through a peritectic decomposition. It will be understood that in the second reaction scheme reactants are present which melt, e.g., the TiAl.

As noted in the above first reaction one mole of TiN can be used with one mole of $AlB_2$ to prepare the $TiB_2$ plus AlN product on a 1:1 molar basis. Thus, although it is broadly contemplated that this product may contain from about 10 to about 90 weight percent $TiB_2$, on this 1:1 molar basis the final product will contain on the order of about 63 weight percent of $TiB_2$. But proportions in the final product may be varied. One manner of varying proportions is to use some $TiB_2$ and/or AlN diluent in the reaction product. As the reaction mixture is supplemented with diluent AlN, a final product can be readily produced where the $TiB_2$ may approach 50 weight percent or less of the final product. On the other hand, adding some diluent $TiB_2$, the final product may easily be made to contain approximately 75 weight percent or more of $TiB_2$ and a balance of AlN. It is to be understood that such diluent will usually be admixed with the reactants as very finely divided particulates, although other forms can be useful, including diluent fibers, e.g., AlN fibers.

Such use of diluent in the starting materials may be tailored to the needs of the final product. As an example, in the production of the ceramic composite for the armor plate, it may be desirable to provide a composite material having a gradient in the final product composition along its cross section. Using $AlB_2$ alone in the starting mixture will yield a $TiB_2$:AlN molar ratio of 1:1. On the other hand, by the use of diluent in the reaction mixture, a differing molar ratio in the final product, e.g., a 2:1 molar ratio for the $TiB_2$:AlN, may be achieved. Thus where diluent may be mixed in a graded proportion through the reaction mixture, the final product will also exhibit a constituency gradient. The high ratio, e.g., a 2:1 molar ratio, and thus a more dense material, can be present at one portion of the final product.

Although proportions can thus be varied, it is still nevertheless contemplated to advantageously provide at least about 25 weight percent of AlN in the final product for enhanced fracture toughness. Preferably the ceramic composite will contain at least about 30 to 45 weight percent of AlN for best fracture toughness.

In this most special aspect where the ceramic composite is produced by reaction hot pressing in accordance with the foregoing reaction schemes, the reactants in the starting mixture should be very finely divided particulates, e.g., powders, and, as mentioned hereinbefore, the diluents may also be in such form. For desirable reactant mixing, the reactants have particle size of less than about 100 microns, and preferably for best mixing are yet more finely divided, e.g., have particle size smaller than about 40 microns in their largest dimension. This will be sufficient to promote the formation of small sized grains in the final product. Usually, the reactants will be of a particle size such that all to virtually all of the particles are within the range from about one to about 80 microns. It will thus be appreciated that extremely finely divided reactants are not critical. A preponderance of particulate reactants having particle size on the order of sub-micron or less, need not be present to provide a final product having desirable small grain structure.

In initiating the reaction hot pressing for the first reaction scheme presented hereinabove, for best influencing the microstructure of the final product, the reactants are first heated at a moderate rate of increasing temperature that is above 10° C. per minute. This rate is continued up to a first temperature that is about 50° to 600° C. lower than the peritectic decomposition temperature. A temperature increase of less than 10° C. per minute can be inefficient. So preferably for better efficiency, such moderately elevating temperature rise is at least about 15° C. per minute and may often be more, e.g., 30° C. To avoid local overheating, such increase however will not generally exceed above about 100° C. per minute.

As such processing is then approaching the first temperature that is on the order of about 50° to 600° C. lower than the peritectic decomposition temperature, the temperature increase is substantially slowed to one that is the lowest rate of increasing temperature and is less than 10° C. per minute. An increase of 10° C. or more at this stage might lead to deleterious local overheating in the reaction mixture. For most desirable elimination of local overheating this rate advantageously does not exceed about 8° C. per minute. Most always, this lowest temperature increase will be at a rate less than about 5° C. per minute, e.g., within the range of between about 0.1° and about 5° C. per minute. An increase of less than about 0.1° C. per minute can be inefficient. Since the initial moderate rate of increasing temperature may generally be on the order of 15°–30° C. per minute and this is reduced to a lowest rate often on the order of 1°–8° C., the ratio of the temperature rate decrease can typically te from 2:1 to approximately 15:1.

As will be understood, the peritectic decomposition of, for example, the AlB$_2$, is a sluggish decomposition providing a "fluid" temperature range than can often vary over a range of 100° C. or even more. From tis it can be appreciated that selecting a temperature below such peritectic decomposition temperature where the temperature increase is reduced, and thus the heating rate can be expected to be reduced, is subject to a greater degree of latitude than would be the case if the peritectic decomposition was sharply defined. Moreover where the elevating temperature rate is reduced at a point 50°–600° C. lower than the peritectic decomposition, this further adds to the degree of latitude for the point where such heating rate will be reduced.

It is to be understood that this lowest rate of increasing temperature may be varied such that for example at its initiation, an increase on the order of about 4°–7° C. per minute may be used. This can then be gradually reduced as the peritectic decomposition range is more closely approached. The heating can proceed through the decomposition range in a most reduced mode, such as on the order of about 0.5°–2° C. per minute. During this most reduced mode, e.g., as the peritectic decomposition is taking place, it may be necessary to withdraw heat to avoid local overheating of the mixture and thereby to enhance production of very fine grained product.

In the last step of the reaction hot pressing, the peritectic decomposition is followed by a jump in the heating rate to establish a most substantial rate of increasing temperature to above 20° C. per minute for proceeding with the reaction sintering. Preferably, for best efficiency as well as reduction of deleterious impurities in the final product, such increase is at least about 30° C. per minute and may be as great as 200° C. per minute. A heating rate of greater than 200° C. per minute can be uneconomical. For a best impurity-free final product, as well as for processing efficiency, this last and most substantial temperature increase will be within the range of from about 50° C. to about 150° C. per minute. Owing to the predecessor moderate rate of increasing temperature being on the order of, for example, 5° C. per minute, and the jump to the most substantial rate providing a rate of typically 25° C. to 150° C., the ratio of this temperature rate increase can often be from 5:1 to as much as 30:1 or more.

This most substantial increase will be continued for a time sufficient to provide a final reaction sintering temperature maximum advantageously not in excess of the melting point of any ceramic product under the conditions of the processing. When a maximum temperature has been attained, this is generally maintained to provide a "heat soak" for the final stage of the reaction sintering. The final rapid temperature increase, as well as the elevated temperature heat soak, can be most beneficial for providing a final product of most desirable density and interconnected microstructure.

It is also contemplated that additional representative schemes for preparing the ceramic composite by reaction hot pressing will be useful in the present invention for preparing the SiC-AlN and B$_4$C-AlN composites. These reactions are as follows:

$$Al_4C_3 + Si_3N_4 \rightarrow 3SiC + 4AlN$$

$$Al_4C_3 + 4BN + 8B \rightarrow 3B_4C + 4AlN$$

In addition to the products from the foregoing reactions, the composites of further interest for this invention include mixtures of these products, as well as mixtures thereof with the TiB$_2$-AlN ceramic composite. Moreover, the discussion hereinabove in regard to diluents is likewise applicable for the products of the foregoing reactions. For example, diluent SiC or B$_4$C may be utilized to vary final product proportions and useful diluents can take varied forms, such as SiC fibers.

For any of the useful products, including those prepared by any of the foregoing reaction schemes, the final product will have a microstructure comprising grains for the one component that are at least in part interconnected ceramic grains, the interconnection being with grains of the second, or additional components. When any of the foregoing reaction schemes have been employed, and thus reaction hot pressing has been utilized, these interconnected grains will be reaction product grains, e.g., TiB$_2$ and AlN reaction product grains where the first reaction scheme has been used. Where a process such as conventional hot pressing or pressureless sintering is initiated with, for example, particulate TiB$_2$ and AlN starting material, the interconnected grains of the final product will be provided by such particulate starting material. It is to be understood however that where diluents have been used in product preparation, such interconnected ceramic grain microstructure can be in mixture with diluent of differing structure. For example if AlN diluent in fiber form is used with the first reaction scheme, the reaction products of interconnected TiB$_2$ and AlN reaction product grains can be intermingled with AlN fibers. The interconnected grains will generally have size of less than about five microns and may be even more finely divided. Also, the product can be expected to have a high density of at least 95 percent of theoretical density, and usually will be more dense, e.g., 96–99 percent of the theoretical. These aspects of high density and a microstructure which can be based upon interconnected ceramic grains, can yield enhanced ballistics properties for the final product.

The following examples show ways in which the invention has been practiced. However these examples are not to be construed as limiting the invention.

EXAMPLE 1

Equimolar quantities of TiN (420 grams) having a particle size of less than 40 microns and $AlB_2$ (330 grams) having a particle size of less than 40 microns were dry milled. The 750 grams blend was loaded into a graphite die. The die was placed in the load train of a vacuum hot-press. The furnace program was controlled by computer using a tungsten-rhenium thermocouple. Once a reduced pressure of $10^{-4}$ Torr around the die was established the powder was heated under an elevated die pressure at a rate of 10° C./min. to a temperature of 900° C. and held at 900° C. for 30 minutes. At this point the heating rate was reduced to control the sensitive peritectic decomposition. The powder was heated at 3° C./min. until 1500° C. was reached, which heating included the $AlB_2$ decomposition. The temperature was then increased at a rate of approximately 5° C./min. until a maximum temperature of 1800° C. was achieved. The 1800° C. maximum was held for 30 minutes. The pressure on the die was also increased to approximately 4000 psi and the die was held at such elevated pressure condition for 30 minutes. The product was then cooled at furnace rate to room temperature.

The product thus obtained was a tile having an Archimedes density of 3.91 g/cm$^3$, or approximately 99% of the calculated theoretical density. From the product tile there was cut by wire electric discharge machining (wire EDM) a test specimen having a 2 inch square face.

For comparative purposes, a sample of pure $TiB_2$ was prepared using conventional hot pressing methods. A tile, 4 inches by 4 inches by 0.75 inch was hot pressed at a vacuum of $10^{-4}$ Torr at 1950° C. for 30 minutes. The comparative sample of $TiB_2$ had a density of 4.50, or 99.6% of theoretical. From this tile, a test specimen, having a 2 inch square face was cut by wire EDM.

Both of the 2 inch square specimens were machined to final thicknesses equivalent to areal densities of 13 lb/square foot. The $TiB_2$ specimen had a final thickness of 0.556 inch; the $TiB_2$-AlN specimen had a final thickness of 0.643 inch.

The test rig consisted of a 6 inch by 6 inch by 3 inch block of aluminum (6061 alloy) with a cavity of the same dimensions as the ceramic specimens machined into it. Hence for the invention structure, the ratio of the thickness of the aluminum to the $TiB_2$-AlN is 2.357:0.643 or about 3.67:1. The ceramic specimens were fitted and epoxied into the cavities, and a 10 mm thick plate of aluminum (7017 alloy) was bolted over the ceramic specimens. A tungsten rod, 0.3 inch diameter and 1.175 inches long, was fired at the assembly at a velocity of 1.21 km/second.

After impact, the aluminum blocks were sectioned to determine the penetration depth of the tungsten projectiles. The tungsten projectile penetrated the aluminum block with the $TiB_2$-AlN face to a depth of 21 mm; the aluminum block with the $TiB_2$ face was penetrated to a depth of 22 mm. This result demonstrates that the replacement of a portion of the $TiB_2$ with AlN enhances the ballistic performance of the armor against high kinetic energy threats.

EXAMPLE 2

Samples of both $TiB_2$ and $TiB_2$-AlN, processed in the manner of Example 1, were found to have densities for the $TiB_2$ of 4.52 g/cm$^3$, or 99.9% of theoretical, and 3.90 g/cm$^3$, or 99% of theoretical for the $TiB_2$-AlN The test specimens had thicknesses equivalent to areal densities of 8 lb/square foot. The samples were epoxied onto flat faces of substrate aluminum 6061 alloy. There was then fired into each mounted specimen assembly a 0.50 caliber steel-core, M2 armor piercing projectile at a muzzle velocity of 2800 feet/second. In this test the $TiB_2$ specimen assembly had penetration behind the specimen of 9.0 mm. for an efficiency factor of 5.26 and the $TiB_2$-AlN specimen sample had a penetration behind the specimen of 7.9 mm. for a more desirable efficiency factor of 5.38.

We claim:

1. An armor plate layered composite for protection against projectiles and having enhanced resistance to penetration from high kinetic energy projectiles, which armor plate comprises a metal substrate and a surface layer composite ceramic on said substrate of very finely-divided and interconnected grains of $TiB_2$ and AlN.

2. The armor plate of claim 1, wherein said metal substrate comprises one or more of an elemental metal, alloy or intermetallic mixture.

3. The armor plate of claim 1, wherein said metal substrate comprises a metal selected from the group consisting of steel, aluminum, titanium and alloys and intermetallic mixtures thereof.

4. The armor plate of claim 1, wherein said surface layer ceramic contains from 10 to 90 weight percent $TiB_2$ and a balance of AlN.

5. The armor plate of claim 1, wherein said ceramic layer of interconnected grains of $TiB_2$ and AlN is prepared by one or more of conventional hot pressing, reaction hot pressing, hot isostatic pressing or pressureless sintering.

6. The armor plate of claim 1, wherein said metal substrate and ceramic surface layer are secured together by one or more of adhesive bonding, diffusion bonding, mechanical fastening, brazing, welding, soldering or combinations thereof.

7. The armor plate of claim 1, wherein said metal substrate and said composite ceramic are present together in a thickness having a ratio of metal to ceramic of from about 1:1 to about 6:1.

8. The armor plate of claim 1, wherein said plate is a multi-layer plate of greater than two layers.

9. The armor plate of claim 8, wherein said ceramic surface layer has a metal cover layer over same.

10. The armor plate of claim 1, wherein said ceramic has a density of at least 95 percent of theoretical density.

11. The armor plate of claim 1, wherein said ceramic has a microstructure comprising interconnected grains, of a grain size less than about five microns, the grains being of a $TiB_2$ reaction product, the grains of which are interconnected in grains of AlN reaction product.

12. The armor plate of claim 1, wherein said ceramic has a microstructure of interconnected reaction product grains in mixture with particulate ceramic diluent of one or more of $TiB_2$, AlN or their mixtures.

13. The armor plate of claim 12, wherein said particulate ceramic diluent is in fiber form.

14. An armor plate layered composite for protection against projectiles and having enhanced resistance to penetration from high kinetic energy projectiles, which armor plate comprises a metal substrate and a surface layer composite ceramic on said substrate of AlN in mixture with one or more of $TiB_2$, SiC or $B_4C$, with said surface layer having very finely-divided and interconnected ceramic grains.

15. The armor plate of claim 14, wherein said metal substrate comprises one or more of an elemental metal, alloy or intermetallic mixture.

16. The armor plate of claim 14, wherein said metal substrate comprises a metal selected from the group consisting of steel, aluminum, titanium and alloys and intermetallic mixtures thereof.

17. The armor plate of claim 14, wherein said ceramic layer of interconnected ceramic grains is prepared by one or more of conventional hot pressing, reaction hot pressing, hot isostatic pressing or pressureless sintering.

18. The armor plate of claim 14, wherein said metal substrate and ceramic surface layer are secured together by one or more of adhesive bonding, diffusion bonding, mechanical fastening, brazing, welding, soldering or combinations thereof.

19. The armor plate of claim 14, wherein said metal substrate and said composite ceramic are present together in a thickness having a ratio of metal to ceramic of from about 1:1 to about 6:1.

20. The armor plate of claim 14, wherein said plate is a multi-layer plate of greater than two layers.

21. The armor plate of claim 20, wherein said ceramic surface layer has a metal cover layer over same.

22. The armor plate of claim 14, wherein said ceramic has a microstructure comprising interconnected grains of a grain size less than about five microns.

23. The armor plate of claim 14, wherein said ceramic has a microstructure comprising interconnected reaction product grains in mixture with particulate ceramic diluent of one or more of $TiB_2$, AlN, SiC, $B_4C$ or their mixtures.

24. The armor plate of claim 23, wherein said particulate ceramic diluent is in fiber form.

25. An armor plate composite for protection against projectiles and having enhanced resistance to penetration from high kinetic energy projectiles, which armor plate comprises a composite ceramic of very finely-divided and interconnected grains of $TiB_2$ and AlN.

26. The armor plate of claim 25, wherein said composite ceramic is in association in said plate with one or more of a metal or plastic.

27. The armor plate of claim 25, wherein said ceramic composite is utilized in association with a spall cover.

28. The armor plate of claim 25, wherein said ceramic composite forms a part of an assembly which includes material in fibrous or woven form.

29. An armor plate composite for protection against projectiles and having enhanced resistance to penetration from high kinetic energy projectiles, which armor plate comprises a composite ceramic of very finely-divided and interconnected grains of AlN in mixture with one or more of SiC, $B_4C$ or $TiB_2$.

30. The armor plate of claim 29, wherein said composite ceramic is in association in said plate with one or more of a metal or plastic.

31. The armor plate of claim 29, wherein said ceramic composite is utilized in association with a spall cover.

32. The armor plate of claim 29, wherein said ceramic composite forms a part of an assembly which includes material in fibrous or woven form.

* * * * *

UNITED STATES PATENT AND TRADEMARK OFFICE
CERTIFICATE OF CORRECTION

PATENT NO.   : 4,876,941
DATED        : October 31, 1989
INVENTOR(S)  : Barnes et al It is certified that error appears in the above-identified patent and that said Letters Patent is hereby corrected as shown below:

On the Cover Page: "Barnes et al.," should read --Barnes--.

Left hand column, Section [75] Inventors: Delete Thomas M. Clere, Hudson, both of; Gholamreza J. Abbaschian, Gainesville, Fla.; Douglas J. Wheeler, Tolland, Conn.

Signed and Sealed this

Twenty-fourth Day of April, 1990

Attest:

HARRY F. MANBECK, JR.

Attesting Officer

Commissioner of Patents and Trademarks